United States Patent [19]

Uekado et al.

[11] Patent Number: 4,668,555
[45] Date of Patent: May 26, 1987

[54] HEAT INSULATING BODY

[75] Inventors: Kazutaka Uekado, Nishinomiya; Kazuo Okada, Toyonaka, both of Japan

[73] Assignees: Matsushita Refrigeration Co.; Takeda Chemical Industries, Ltd., both of Osaka, Japan

[21] Appl. No.: 812,512

[22] Filed: Dec. 23, 1985

[30] Foreign Application Priority Data

Dec. 27, 1984 [JP] Japan ............................ 59-277608
Dec. 27, 1984 [JP] Japan ............................ 59-277609
Dec. 27, 1984 [JP] Japan ............................ 59-277611
Dec. 27, 1984 [JP] Japan ............................ 59-277612
Dec. 27, 1984 [JP] Japan ............................ 59-277614
Sep. 10, 1985 [JP] Japan ............................ 60-199831

[51] Int. Cl.$^4$ .......................... B32B 1/00; B32B 3/00
[52] U.S. Cl. ............................ 428/69; 156/79; 428/71; 428/76; 428/317.5; 428/318.4
[58] Field of Search ............ 222/444, 467, 902; 156/79; 428/69, 71, 76, 317.5, 318.4

[56] References Cited

U.S. PATENT DOCUMENTS 4,451,587 5/1984 Keshi et al. .................... 521/171

FOREIGN PATENT DOCUMENTS 146993 8/1984 Japan ............................ 428/69

Primary Examiner—William J. Van Balen
Attorney, Agent, or Firm—Stevens, Davis, Miller & Mosher

[57] ABSTRACT

A heat insulating body comprising a rigid polyurethane foam of open cell structure, and a vessel formed of metal-plastics laminate film enveloping said rigid polyurethane foam, the whole system being evacuated to reduce the internal pressure and then hermetically sealed; and an adiabatic box comprising said heat insulating body, an inner box and an outer box, said heat insulating body being disposed between said inner box and said outer box and the whole system being subjected to integral foaming with rigid polyurethane foam.

5 Claims, 5 Drawing Figures

11···RIGID POLYURETHANE FOAM OF OPEN-CELL STRUCTURE
12···VESSEL
6···HEAT INSULATING BODY

11···RIGID POLYURETHANE FOAM OF OPEN-CELL STRUCTURE

11···RIGID POLYURETHANE FOAM OF OPEN-CELL STRUCTURE
12···VESSEL
6···HEAT INSULATING BODY

14···OUTER BOX
15···INNER BOX
16···ADIABATIC BOX
17···RIGID POLYURETHANE FOAM

1 ··· HEAT INSULATING STRUCTURE
2 ··· RIGID POLYURETHANE FOAM
3 ··· VESSEL

HEAT INSULATING BODY

FIELD OF INDUSTRIAL UTILIZATION

This invention relates to a heat insulating body used in refrigerators, prefabricated refrigeration rooms, and the like.

PRIOR ART

Figure 4:
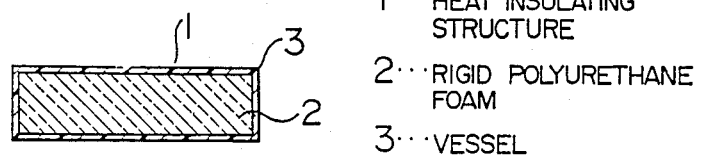
FIG. 4 is a sectional view of a heat insulating body of the prior art.
Figure 5:
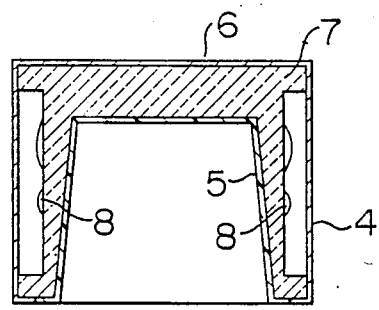
FIG. 5 is a sectional view of an adiabatic box of the prior art using said heat insulating body of FIG. 4.

FIG. 4 shows a heat insulating body of the prior art, and FIG. 5 shows an adiabatic box using said heat insulating body. The structure of prior art examples will be explained below with reference to FIGS. 4 and 5.

It has been attracting attention in recent years to use a heat insulating body having a reduced internal pressure in order to improve the heat insulating property of adiabatic boxes such as refrigerators. Such a heat insulating body has as its core material, powders such as perlite powders, honeycombs and foamed materials. For example, it has been proposed, as disclosed in Japanese Patent Application Kokai (Laid Open) No. 133870/82, to use rigid polyurethane foam having open cells as the core material. Said Japanese Patent Application Kokai No. 133870/82 will be explained with reference to FIG. 4. In the Figure, numeral 1 is a heat insulating body, which comprises a rigid polyurethane foam 2 and a vessel 3 formed of a gastight film and enveloping said foam 2, the whole being evacuated to an internal pressure of 0.001 mm Hg and then hermetically sealed. Said rigid polyurethane foam 2 is characterized by being formed by subjecting a commercially available foam material having a closed cell content of about 80 to 90% and cell skeleton having diameters of about 300 to 1000 μm to evacuation under vacuum at high temperature and high humidity, thus to break the cell membranes and thereby to obtain open the cells. The rigid polyurethane foam 2 has a compressive strength higher than 1 kg/cm² at room temperature, usually about 1.2 kg/cm².

PROBLEMS TO BE SOLVED BY THE INVENTION (i) In such a heat insulating structure 1, since the cell membrane of a rigid polyurethane foam 2 has a high resin strength even at high temperature and high humidity, it is quite possible that the cell membranes will not be broken and hence the open cell content of the resulting foam material would not reach 100%. As a result, even when the heat insulating structure 1 initially has an excellent low thermal conductivity, its internal pressure increases with the lapse of time owing to gases, such as air, water vapor, or flon (chlorofluorohydrocarbon) gas, diffusing gradually from the closed cell portions, resulting in an increased thermal conductivity. For example, when the heat insulating body 1 has a core material of rigid polyurethane foam 2 having a dimension of 30 cm×30 cm×2 cm (volume: 1800 cm³), an average cell diameter of about 300 μm, and an open cell content of 98%, it contains theoretically about 36 cm³ of gas (1800 cm³×0.02) in its 2% closed cell portion. This gas will gradually diffuse, though opposed by the diffusion resistance of cell membranes, to the open cell portion of reduced pressure. According to an experiment of the present inventors, it took about 30 days at room temperature for a complete balance of pressure to be reached, and even in an atmosphere of 80° to 100° C., which is close to the heat distortion temperature of the rigid polyurethane foam, a lapse of 1 to 3 days was necessary to achieve pressure balance. Thus, it is conceivable that in the theoretical example above-mentioned about 36 cm³ of gas will, for the long run, increase the internal pressure from 0.001 mm Hg up to 15 mm Hg, causing the thermal conductivity to deteriorate up to 0.020 kcal/mh°C. or more.

In order to avoid the above-mentioned phenomenon, it will be necessary to maintain the rigid polyurethane foam 2 at a temperature of at least 80° to 100° C. while continuing evacuation with a vacuum pump for one or more days. This procedure can evacuate the gas remaining in the closed the cell portions through cell membranes and decrease the internal pressure to a predetermined value even when the foam contains closed cell portions. However, when the procedure is used in practical production, only one insulating body can be produced per one evacuation apparatus and hence large scale production is very difficult. Further, a large apparatus is necessary for high-temperature and high-humidity treatment, which creates an additional problem in mass production.

In view of the above-mentioned problems, the present invention has, as one of its objects the marked improvement in the productivity of a heat insulating body by making it possible to reduce the internal pressure of the body to a predetermined value in a short time by evacuation, and to maintain the heat insulating property of the insulating body over a long period of time and thus to secure reliability of quality.

(ii) However, in such a heat insulating body 1, some organic gas can sometimes be evolved with the lapse of time from inside of the resin forming the rigid polyurethane foam 2, thereby raising the internal pressure and causing the deterioration of its heat insulating property. Thus, a rigid polyurethane foam 2 contains, in its raw material composition, some components which do not react with isocyanate groups, and, even after the reaction forming the rigid polyurethane foam 2 has been completed, it contains some remaining monomer of low molecular weight which has not been converted to resin. These components will gradually vaporize within the heat insulating body 1, causing a rise of its internal pressure. Experiments show that complete vaporization of these volatile components in the heat insulating body 1 can sometimes be attained only after a lapse of about 80 days when the body is let to stand at room temperature. Thus, it is conceivable that even when a heat insulating body has an excellent initial insulating property, organic gas can be evolved gradually while the body is in use over for a long period of time, causing the rise of internal pressure and results in the deterioration of the heat insulating property, which gives rise to a serious problem in the quality of such a heat insulating body.

In view of the above problems, this invention has, as a further object, the provision of a heat insulating body in which no organic gas is evolved from the resin with the lapse of time, no increase in the internal pressure takes place and the insulating property is maintained over a long period of time.

(iii) Further, in such a heat insulating body 1, of the prior art the cell skeleton diameter of the rigid polyurethane foam 2 is in the range of 300 to 1000 μm, such that the thermal conductivity of the interior gas does not become sufficiently low and hence an excellent heat insulating property cannot be obtained unless the internal pressure is reduced to 0.001 mmHg or less. Fundamentally, the thermal conductivity of gas decreases rapidly as the distance between the walls enclosing the gas (namely, the cell skeleton diameter in the present structure) becomes smaller than the mean free path of the gas; the longer the distance between the walls, the lower the necessary pressure for the gas to attain an identical thermal conductivity. This situation is expressed generally by the following formula (1)

$$Kg = A\rho \overline{V} C\gamma [Lfd/(Lf+d)] \tag{1}$$

wherein Kg is the thermal conductivity of a gas; A is a constant, $\rho$ is the density of the gas [kg/m$^3$]; $\overline{V}$ is the mean velocity of molecules [m/s]; Lf is the mean free path; C$\gamma$ is the specific heat at constant volume [kcal/kg°C.]; and d is the distance between walls [m].

Since the cell skeleton diameter of the prior art is in the range of 300 to 1000 μm, the management of a low pressure of $10^{-3}$ mmHg or less in an industrial setting is difficult. This has caused, in large scale production, such problems as the necessity of large equipment and a prolonged evacuation time. A further problem is that when the internal pressure of the heat insulating body is in the range of $10^{-3}$ mmHg or less, it is susceptible to the effect of the gas released from the constituent material; and in the case of the above-mentioned prior art body formed of an organic material which is likely to contain a monomer component of low molecular weight, a particularly long time is necessary for evacuation, which results in a poor efficiency in mass production.

In view of the above problems, this invention enables the attainment of a heat insulating body having excellent insulating property at a low degree of vacuum which can be easily produced in industrial operation, thus reducing both the time necessary for evacuation and also facilitating mass production.

(iv) Further, in the prior art heat insulating body 1 mentioned above, which has as its base material, a rigid polyurethane foam 2 prepared by a conventional foaming method from a general-purpose resin material, a large portion of heat is conducted by solid thermal conductance through the cell skeleton, and consequently a practical, satisfactory heat insulating property has not been obtained unless the portion of heat conducted by the gas is made sufficiently small.

Thus, in the prior art, since the cell skeleton diameter is approximately in the range of 300 to 1000 μm, the contribution of gas thermal conductance does not become sufficiently small, and an excellent heat insulating property has not been obtained, unless the internal pressure is reduced down to 0.001 mmHg. From the viewpoint of production efficiency, however, the evacuation down to 0.001 mmHg of the interior of a heat insulating structure 1 having cell skeleton diameters of about 300 to 1000 μm, and in which the evacuation conductance is very small, requires a very long time for evacuation, causing a serious problem in mass production. A further problem occurs in that when the internal pressure of the heat insulating structure is in a high vacuum region of 0.001 mmHg, it is susceptible to the effect of the gas released from the constituent material; and in the case of organic foamed material which is likely to contain an ureacted monomer component of low molecular weight, a long evacuation time is necessary.

In view of the above problems, the present invention, has as an additional object, the provision of a heat insulating body which can be produced with a shortened time of evacuation and in a large scale, obtaining a rigid polyurethane foam exhibiting an excellent heat insulating property even when prepared at a region of vacuum which can be easily handled in industrial operation.

(v) Further, when a heat insulating structure 7 as shown in FIG. 5 is disposed between the inner box 5 and the outer box 6 of an adiabatic box 4 as shown in FIG. 5 and the whole system is subjected to integral foaming using a rigid polyurethane foam 7 of closed cell structure, the temperature of the part of the heat insulating structure 1 adjacent to the rigid polyurethane foam 7 is elevated up to 100° to 120° C. by the heat of reaction. Since the temperature of 100° to 120° C. is close to the heat distortion temperature of the rigid polyurethane foam 7, the foam begins to soften, markedly loses its strength, and undergoes deformation and contraction by the action of atmospheric pressure and foaming pressure. For example, when a foam has a compressive strength of about 1.2 kg/cm$^2$, it easily undergoes deformation and contraction at 120° C. since its strength at that temperature is reduced to 30 to 40% of that at normal temperature. As a result, some voids 8 were formed in the vicinity of the heat insulating structure, or deformation of the inner box 5 or the outer box 6 occurred, thus often causing problems from the viewpoint of appearance.

In view of the above problems, the present invention has as a further object the improvement in the heat insulating property of an adiabatic box and the elimination of problems regarding its quality by providing a heat insulating body which undergoes no deformation nor contraction even in integral foaming with a rigid polyurethane foam and which has an excellent heat insulating property.

MEANS FOR SOLVING THE PROBLEMS

According to this invention, there is used, in order to solve the above-mentioned problems, as the core material of a heat insulating body a rigid polyurethane foam which uses as its raw materials an organic polyisocyanate, a polyol, a catalyst, a blowing agent and, as a cell-interconnecting agent, 0.1 to 5.0 parts by weight of a powdery divalent metal salt of a saturated monocarboxylic acid relative to 100 parts by weight of the polyol.

By virtue of the above composition, cell membranes are broken during the foaming process and the core material formed has an open cell content of 100%. This core material is enveloped in a vessel formed of metal-plastics laminate film and the interior thereof is evacuated. Accordingly, evacuation can be achieved in a short time to reduce the internal pressure of the heat insulating body uniformly to a predetermined value. Further, since the heat insulating body contains no closed-cell portion, it undergoes no increase in internal pressure over a long period of time and maintains its initial heat insulating property.

Examples of powdery divalent metal salts of a saturated monocarboxylic acid usable in this invention include calcium stearate, magnesium stearate, strontium stearate, and calcium myristate.

Ordinary polyisocyanates conventionally used for preparing rigid polyurethane foam can also be used in this invention. However, in order to solve the problem mentioned in (ii) above, there is used an organic isocyanate having an amine equivalent of 120 to 180 which is obtained from purified diphenylmethane diisocyanate, a modification product of purified diphenylmethane diisocyanate, and a prepolymerizied product of purified tolylene diisocyanate obtained by preliminary reaction of purified tolylene diisocyanate with polyol, each alone or in a mixture thereof. Raw materials for polyurethane comprising the above-mentioned organic isocyanate, a polyol, a catalyst, a foam stabilizer, a blowing agent, and a cell-interconnecting agent are mixed together and then foamed to form a rigid polyurethane foam of open cell structure. The polyurethane foam thus obtained is used as the core material of the heat insulating body and enveloped in a vessel formed of metal-plastics laminate film. The whole system thus obtained is evacuated to reduce the internal pressure and then hermetically sealed, whereby the intended heat insulation body is obtained. The purified diphenylmethane diisocyanate or the purified tolylene diisocyanate referred to in this invention is an isocyanate which has been obtained after purification by distillation and contains no distillation residue nor the like. For instance, examples of purified tolylene diisocyanate include commercially available Takenate R 80 (a trade name, mfd. by Takeda Chemical Industries, Ltd.).

Since all of the components of urethane raw material having the above-mentioned composition used in this invention participate in the reaction to be converted into resin, the resulting rigid polyurethane foam resin contains no unreacted low molecular monomer which, if present, would evaporate as organic gas with the lapse of time, increase the internal pressure, and deteriorate the heat insulating property.

Polyols which can be used in this invention may be those which have previously been used conventionally for production of rigid polyurethane foams. Particularly, a heat insulating body of excellent insulating property can be obtained by using as the core material of the insulating body a rigid polyurethane foam of open cell structure obtained by using a polyol containing 70% by weight or more of a polyether polyol having a hydroxyl value of 300 to 550 mg KOH/g obtained by addition polymerization of an alkylene oxide to an aromatic diamine, an organic polyisocyanate catalyst, a blowing agent, and a cell-interconnecting agent. Examples of aromatic diamines usable in this invention include tolylenediamine (ortho, meta or para compound, or a mixture thereof), and 4,4'-diphenylmethanediamine.

By virtue of the above-mentioned composition of the raw material, the core material in this invention has a minute cell structure. Accordingly, when the core material is enveloped in a vessel formed of metal-plastics laminate film and the internal pressure is reduced, an excellent heat insulating property can be obtained even at a pressure of about 0.1 to 0.01 mmHg which can be easily handled in industrial operation. The efficiency in mass production is markedly improved by the reduction of time necessary for evacuation.

According to this invention, there is used as the core material of a heat insulating body a rigid polyurethane foam obtained by foaming a mixture which contains as a foam stabilizer 3 parts by weight or more of a silicone-type surface active agent having a hydroxyl group at the terminus of the molecular structure relative to 100 parts by weight of polyol.

The core material used in this invention has a minute cell skeleton by virtue of the above-mentioned composition. Accordingly, when the core material is enveloped in a vessel formed of metal-plastics laminate film and the whole system is evacuated to reduce the internal pressure, an excellent heat insulating property is obtained even at a pressure of about 0.1 to 0.01 mmHg which can be easily achieved in industrial operation. The efficiency in mass production is markedly increased by the reduction of time necessary for evacuation.

Examples of silicone-type surface active agents having a hydroxyl group at the terminal of their molecular structure include Silicone F-305, F-308 and F-335 (each a trade name, mfd. by Shin-etsu Chemical Co., Ltd.) and Tegostab B-8404 (a trade name, mfd. by Goldschmidt Co.).

According to this invention, in producing a rigid polyurethane foam of open cell structure by using an organic polyisocyanate, a polyol, a catalyst, a foam stabilizer, a blowing agent and a cell-interconnecting agent in order to solve the above-mentioned problems, foaming is effected by selecting a ratio of the organic polyisocyanate to the polyol of 1.3 to 3.0 in terms of NCO/OH equivalent ratio and using an isocyanate-trimerization catalyst as the catalyst, and the rigid polyurethane foam of open cell structure thus obtained is used as the core material for a vacuum heat-insulating body.

The organic polyisocyanate and the polyol to be used as the raw material and the foam stabilizer and the blowing agent to be used as the compounding ingredient may be those which have been conventionally used in producing rigid polyurethane foams. Examples of the isocyanate-trimerization catalyst are metal salts of organic carboxylic acids, tertiary amine compounds, and quaternary ammonium salts. More particularly, DABCO-TMR (a trade name, mfd. by Sankyo Air Productions Co.) and POLYCAT-41 (a trade name, mfd. by Sun Abott Co.) can be used, for example. The trimerization catalyst is used in an amount of 0.5 to 5 parts based on 100 parts of polyol. A so-called urethanization catalyst which has been conventionally used in producing polyurethane foam may also be used together with the above-mentioned trimerization catalyst. Examples of cell-interconnecting agents which can be used include divalent metal salts of stearic acid such as calcium stearate.

By virtue of the above composition, cell membranes are broken during the foaming process. Thus, a core material can be obtained which has an open cell content of substantially 100% and in which the contribution of solid thermal conductance through cell skeletons is small. When the core material is enveped in a vessel formed of metal-plastics laminate film and the whole is evacuated to reduce the internal pressure, a heat insulating body can be obtained which exhibits an excellent heat insulating property even at a pressure of about 0.1 to 0.01 mmHg, which can be easily achieved in industrial operation.

The rigid polyurethane foam of open cell structure is, as required, preferably heat treated to remove adsorbed volatile matters such as water before being enveloped in the vessel formed of metal-plastics laminate film.

According to this invention, in order to solve the problem (v) mentioned above, a rigid polyurethane foam of open cell structure which has a compressive strength of 1.5 kg/cm² or more at 120° C. and is obtained by foaming a mixture of a polyol containing 70% by weight or more of a polyether polyol obtained by addition polymerization of an alkylene oxide to an aromatic diamine and having a hydroxyl value of 300 to 550 mg KOH/g, an organic polyisocyanate, a catalyst, a foam stabilizer, a blowing agent, and a cell-interconnecting agent is enveloped in a vessel formed of metal-plastics laminate film, and the whole is evacuated to reduce the internal pressure. The heat insulating body thus obtained is then disposed between the inner box and the outer box of an adiabatic box and the whole system is subjected to integral foaming using a rigid polyurethane foam. Examples of aromatic diamines usable in this invention include tolylenediamine (ortho, meta, or para compound or a mixture thereof) and 4,4'-diphenylmethanediamine.

Owing to the above-mentioned composition of this invention, the rigid polyurethane foam of open cell structure does not undergo deformation or contraction due to decrease in strength by the action of atmospheric pressure and foaming pressure even when subjected to the heat of reaction generated in integral foaming; further, by virtue of the characteristic of the polyol used the above-mentioned effect can be achieved at a low density. Consequently, the contribution of solid thermal conductance of urethane resin is decreased to give an excellent heat insulating property. Thus, a heat insulating body excellent in both strength and heat insulating property can be obtained, which in turn provides an adiabatic box having an excellent heat insulating property and a stable quality.

The catalyst and the blowing agent used in this invention for forming polyurethane foam may be those conventionally used in the prior art.

EXAMPLE I

Figure 1:
FIG. 1 is a perspective view of a rigid polyurethane foam of open cell structure in one embodiment of this invention.
Figure 2:
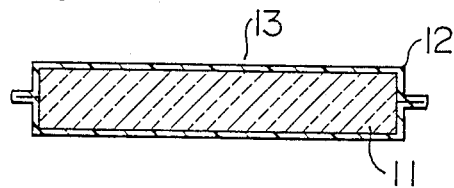
FIG. 2 is a sectional view of a heat insulating body in the same.

An embodiment of this invention will be described below with reference to FIGS. 1 and 2.

In the Figures, numeral 11 indicates a rigid polyurethane foam cut to a predetermined dimension which has been prepared by subjecting a mixture comprising the raw materials shown in the following Table in a composition (parts) shown in the same to foaming in a high-pressure urethane foaming machine followed by curing, and then to aging at normal temperature.

TABLE 1

| | | Example | | | | Comparative Example | |
|---|---|---|---|---|---|---|---|
| | | 1 | 2 | 3 | 4 | A | B |
| Raw material composition (parts) | Polyol A | 100 | — | — | — | 100 | — |
| | Polyol B | — | 100 | — | 100 | — | 100 |
| | Polyol C | — | — | 100 | — | — | — |
| | Foam stabilizer | 1.5 | 1.5 | 1.5 | 1.5 | 1.5 | 1.5 |
| | Blowing agent | 25 | 20 | 25 | 20 | 25 | 20 |
| | Blowing agent H₂O | 0 | 0.5 | 0 | 0.5 | 0 | 0.5 |
| | Catalyst A | 2.0 | 2.0 | 2.0 | 2.0 | 2.0 | 2.0 |
| | Catalyst B | — | 0.1 | — | — | 0.1 | — |
| | Cell-interconnecting agent | 0.5 | 0.5 | 0.5 | 5.0 | 0.05 | 6.0 |
| | Organic polyisocyanate A | 130 | 126 | — | — | 130 | — |
| | Organic polyisocyanate B | — | — | 118 | 114 | — | 114 |
| Density of rigid urethane foam (kg/m³) | | 45 | 43 | 48 | 50 | 45 | Defoaming (No foam is formed) |
| Open cell content of rigid urethane foam (%) | | 100 | 100 | 100 | 100 | 75 | |
| Thermal conductivity of heat insulating body (kcal/mh °C.) | Initial value | 0.0062 | 0.0065 | 0.0064 | 0.0068 | 0.0113 | |
| | After 30 days | 0.0062 | 0.0065 | 0.0064 | 0.0068 | 0.0308 | |

In Table 1, polyol A is a polyether polyol having a hydroxyl value of 442 mg KOH/g obtained by addition polymerization of propylene oxide (hereinafter referred to as PO) to an aromatic diamine used as an initiator. Polyol B is a polyether polyol having a hydroxyl value of 400 mg KOH/g obtained by addition polymerization of PO to socrose, ethylenediamine and diethylene glycol used as an initiator. Polyol C is a mixed polyether polyol comprising polyol A and polyol B in a ratio of 70:30. The foam stabilizer is a silicone surface active agent F-338 (mfd. by Shin-etsu Chemical Co., Ltd.) and the blowing agent is Flon R-11 (mfd. by Showa Denko K.K.). Catalyst A is dimethylethanolamine and catalyst A is dibutyl tin dilaurate. The cell-interconnecting agent is calcium stearate manufactured by Nippon Oil & Fats Co., Ltd. Organic polyisocyanate A is a polyisocyanate having an amine equivalent of 150, obtained by reacting tolylene diisocyanate with trimethyolpropane and diethylene glycol; organic polyisocyanate B is a crude diphenylmethane diisocyanate having an amine equivalent of 136 manufactured by Nippon Polyurethane Industry Co., Ltd. These raw materials were used in various combinations to be made into foams. Some of the foams thus obtained are shown in Table 1 as Nos. 1 to 4 of Example and as Comparative Example Nos. A and B. The density and the open cell content of these rigid polyurethane foams 4 are also shown in Table 1.

The polyurethane foam was subsequently heated at 120° C. for about 2 hours to evaporate adsorbed moisture, and enveloped in a bag-formed vessel 12 formed of metal-plastics laminate film having a laminate structure of aluminum-deposited polyester film and polyethylene film. The whole was evacuated to reduce the internal pressure down to 0.05 mm Hg and hermetically sealed to give a heat insulating body 13. The evacuation time was 3 minutes. The initial value of thermal conductivity of the heat insulating body 13 thus obtained immediately after the sealing and the value after 30 days of standing are also shown in Table 1. The thermal conductivity was determined at a mean temperature of 24° C. by using K-Matic (a trade name, mfd. by Shinku Riko K.K.).

As is clear from the Table 1, rigid polyurethane foam 11 obtained by foaming a mixture comprising a polyol, an organic isocyanate, a catalyst, a foam stabilizer, a blowing agent and, as a cell-interconnecting agent, 0.1 to 5.0 parts by weight of a powdery divalent metal salt of a saturated monocarboxylic acid relative to 100 parts by weight of the polyol was found to have an open cell content of 100%. This is presumably because the powdery divalent metal salt of a saturated monocarboxylic acid is dispersed onto the walls of the cells in foaming of the rigid polyurethane foam 11, thereby making the membrane thickness uneven and causing the cells to break, although the detail of this process has not yet been elucidated. Since the rigid polyurethane foam 11 having an open cell content of 100% and containing no closed cell portion is used as the core material of the heat insulating body 13, the internal pressure of the insulating body 13 can be reduced uniformly to a predetermined value through the open cell with a short time of evacuation, which gives an excellent efficiency in mass production. Further, since the foam has no closed cell portion which contains gases therein, the heat insulating body 13 is not subject to increase in internal pressure due to the gas diffused from closed cell portion even after standing a long time. Accordingly, the heat insulating property of the heat insulating body 13 does not deteriorate for a long period of time, which contributes greatly to secure a stable quality. On the other hand, polyurethane foam No. A, in which the cell-interconnecting agent was used in an amount of 0.05 part by weight, has an open cell content less than 100% and shows a markedly increased thermal conductivity after a lapse of time. In sample No. B, defoaming occurred without a cell skeleton itself being formed because of excessively strong action of the cell-interconnecting agent, making the product unusable as a core material of a heat insulating body 1.

EFFECT OF THE INVENTION

As is apparent from the above explanation, this invention provides the following effects.

(a) The rigid polyurethane foam obtained by foaming a mixture comprising an organic polyisocyanate, a polyol, a catalyst, a foam stabilizer, a blowing agent and, as a cell-interconnecting agent, 0.1 to 5.0 parts by weight of a powdery divalent metal salt of a saturated monocarboxylic acid based on 100 parts by weight of the polyol acquires a cell structure having an open cell content of 100% and containing no closed cell portion. Accordingly, when the foam is enveloped in a vessel formed of metal-plastics laminate film and the whole is evacuated, the internal pressure can be reduced uniformly to a predetermined value in a short time, which makes it possible to secure good productivity in mass production.

(b) Since the heat insulating body thus obtained contains no closed cell portion, it is not subject to increase in internal pressure due to the gas diffused from closed cell portion even after a long time of standing. Consequently, the heat insulating body undergoes no deterioration in heat insulating property and maintains its stable quality.

EXAMPLE II

The second Example of this invention will be described below.

This Example relates to rigid polyurethane foams prepared by foaming the raw materials used in compositions shown in the Table 2 below, followed by curing. They were then aged at normal temperature and cut to a predetermined dimension.

TABLE 2

|  |  | Example |  |  |  |  |  | Comparative Example |  |  |
|---|---|---|---|---|---|---|---|---|---|---|
|  |  | 5 | 6 | 7 | 8 | 9 | 10 | C | D | E |
| Raw material and composition (parts) | Polyol A | 100 | 60 | 40 | — | 70 | 70 | 100 | 60 | — |
|  | Polyol B | — | 40 | 60 | 100 | 30 | 30 | — | 40 | 100 |
|  | Foam stabilizer | 3.0 | 3.0 | 3.0 | 3.0 | 3.0 | 3.0 | 3.0 | 3.0 | 3.0 |
|  | Blowing agent | 25 | 25 | 25 | 25 | 25 | 25 | 25 | 25 | 25 |
|  | Catalyst | 2.0 | 2.0 | 2.0 | 2.0 | 2.0 | 2.0 | 2.0 | 2.0 | 2.0 |
|  | Cell-interconnecting agent | 1.0 | 1.0 | 1.0 | 1.0 | 1.0 | 1.0 | 1.0 | 1.0 | 1.0 |
|  | Organic polyisocyanate A | 135 | 134 | 133 | 132 | 59.5 | — | — | — | — |
|  | Organic polyisocyanate B | — | — | — | — | 59.5 | — | — | — | — |
|  | Organic polyisocyanate C | — | — | — | — | — | 125 | — | — | — |
|  | Organic polyisocyanate D | — | — | — | — | — | — | 123 | — | — |
|  | Organic polyisocyanate E | — | — | — | — | — | — | — | 112 | 110 |
| Property of rigid urethane foam | Density (Kg/m$^3$) | 48 | 48 | 48 | 46 | 50 | 49 | 43 | 40 | 40 |
|  | Open cell content (%) | 100 | 100 | 100 | 100 | 100 | 100 | 100 | 100 | 100 |
| Thermal conductivity of heat insulating body (kcal/mh °C.) | Initial value | 0.0065 | 0.0063 | 0.0065 | 0.0066 | 0.0065 | 0.0062 | 0.0064 | 0.0065 | 0.0065 |
|  | After 80 days | 0.0067 | 0.0066 | 0.0067 | 0.0068 | 0.0068 | 0.0065 | 0.0125 | 0.0132 | 0.0130 |

In the Table 2, polyol A is a polyether polyol having a hydroxyl value of 442 mg KOH/g obtained by addition polymerization of propylene oxide (hereinafter referred to as PO) to an aromatic diamine used as an initiator. Polyol B is a polyether polyol having a hydroxyl value of 450 mg KOH/g obtained by using sucrose and diethylene glycol as an initiator. The foam stabilizer is a silicone-type surface active agent F-335 (mfd. by Shin-etsu Chemical Co., Ltd.), the blowing agent is Flon R-11 (mfd. by Showa Denko K.K.), the catalyst is dimethylethanolamine, and the cell-interconnecting agent is calcium stearate (mfd. by Nippon Oil & Fats Co., Ltd.). Organic polyisocyanate A is a prepolymerized tolylene diisocyanate having an amine equivalent of 150 obtained by the reaction of purified tolylene diisocyanate (TDI-80) with trimethylolpropane and diethylene glycol. Organic polyisocyanate B is Takenate R 300F (mfd. by Takeda Chemical Industries, Ltd.), which is a purified diphenylmethane diisocyanate having an amine equivalent of 125. Organic polyisocyanate C is Millionate RMTL (mfd. by Nippon Polyurethane Industry, Co., Ltd.) which is a modified product formed by partial carbodiimidation of purified diphenylmethane diisocyanate having an amine equivalent of 143. Further, organic polyisocyanate D is a crude diphenylmethane diisocyanate having an amine equivalent of 136 (mfd. by Nippon Polyurethane Industry, Co., Ltd.) and organic polyisocyanate E is a crude tolylene diisocyanate prepolymer having an amine equivalent of 125 obtained by reacting crude tolylene diisocyanate with trimethylolpropane and diethylene glycol. These raw materials were used in various combinations to be made into foams. Some of the foams thus obtained in the Table 2 as Example Nos. 5 to 10 and as Comparative Example Nos. C to E. The density and the open cell content of these rigid polyurethane foams 4 thus obtained are also shown in the Table 2.

The polyurethane foam was subsequently heated at 120° C. for about 2 hours to evaporate the adsorbed moisture, and enveloped in a vessel 5 formed of metal-plastics laminate film having a laminate structure of aluminum-deposited polyester film and polyethylene film. The whole was evacuated to reduce the internal pressure down to 0.05 mm Hg and then hermetically sealed to give a heat insulating body 6. The evacuation time was 3 minutes. The initial value of thermal conductivity of the heat insulating body 6 thus obtained immediately after the sealing and the value after 80 days of standing are also shown in the Table 2.

As is clear from the Table 2, the heat insulating body 13 using a core material a rigid polyurethane foam 11 prepared by using as the organic polyisocyanate a purified diphenylmethane diisocyanate, a modified product of purified diphenylmethane diisocyanate, and a prepolymerized purified tolylene diisocyanate was found to show a very small change in thermal conductivity with the lapse of time and thus to be satisfactory in practical use. On the other hand, the heat insulating body 13 prepared by using crude isocyanate showed a marked deterioration of thermal conductivity. This is presumably because the crude isocyanate contains some component having no reactivity, which remains in the resin as a low molecular weight monomer even after the reaction to form the rigid polyurethane foam 11 has been completed and gradually vaporizes within the heat insulating body 6, causing the elevation of internal pressure and thereby deteriorating the thermal conductivity, whereas no unreactive component is present in purified isocyanate, causing no such phenomenon. However, the mechanism has not yet been elucidated in detail.

Thus, the use of a rigid polyurethane foam 11 prepared by using as an organic polyisocyanate purified diphenylmethane diisocyanate, a modified product of purified diphenylmethane diisocyanate, and prepolymerized purified tolylene diisocyanate makes it possible to reduce markedly the change with time in thermal conductivity of the heat insulating body 13 formed and thus to contribute greatly to the reliability of quality.

EFFECT OF THE INVENTION

When a rigid polyurethane foam of open cell structure is formed by using as the organic polyisocyanate purified diphenylmethane diisocyanate, a modified product of purified diphenylmethane diisocyanate, and prepolymerized purified tolylene diisocyanate, all of the raw materials are converted into resin and no low molecular weight monomer remains in the foam because the organic polyisocyanate used contains no unreactive component. Consequently, there occurs no vaporization of an organic gas within the insulating body and hence no deterioration of thermal conductivity due to increase in internal pressure. This makes it possible to maintain an excellent heat insulating property over a long period of time and contributes to the stability of quality.

EXAMPLE III

The third Example of this invention will be described below.

This Example relates to rigid polyurethane foams prepared by foaming the raw materials shown in the Table 3 below, followed by curing. They were then aged at normal temperature and cut to a predetermined dimension.

TABLE 3

|  |  |  | Example |  |  |  | Comparative Example |  |
|---|---|---|---|---|---|---|---|---|
|  |  |  | 11 | 12 | 13 | 14 | F | G |
| Raw materials and composition (parts) | Polyol A |  | 70 |  | 100 |  | 60 |  |
|  | Polyol B |  |  | 70 |  | 100 |  | 60 |
|  | Polyol C |  | 30 |  |  |  | 40 |  |
|  | Polyol D |  |  | 30 |  |  |  | 40 |
|  | Foam stabilizer |  | 1.5 | 1.5 | 1.5 | 1.5 | 1.5 | 1.5 |
|  | Blowing agent |  | 25 | 25 | 25 | 25 | 25 | 25 |
|  | Catalyst A |  | 2.0 | 2.0 | 2.0 | 2.0 | 2.0 | 2.0 |
|  | Catalyst B |  | 0.1 | 0.1 | 0.1 | 0.1 | 0.1 | 0.1 |
|  | Cell-interconnecting agent |  | 1.0 | 1.0 | 1.0 | 1.0 | 1.0 | 1.0 |
|  | Organic polyisocyanate |  | 115 | 111 | 118 | 107 | 113 | 112 |
| Property of rigid urethane foam | Density (Kg/m$^3$) |  | 45 ± 2 | 45 ± 2 | 45 ± 2 | 45 ± 2 | 45 ± 2 | 45 ± 2 |
|  | Open cell content (%) |  | 100 | 100 | 100 | 100 | 100 | 100 |
|  | Cell skeleton diameter ($\mu$) |  | 100 ± 30 | 100 ± 30 | 100 ± 30 | 100 ± 30 | 350 ± 50 | 350 ± 50 |
| Thermal conductivity of heat insulating body (kcal/mh °C.) | Internal pressure of heat insulating body (mmHg) | 0.001 | 0.0060 | 0.0062 | 0.0059 | 0.0062 | 0.0063 | 0.0063 |
|  |  | 0.01 | 0.0062 | 0.0062 | 0.0059 | 0.0062 | 0.0072 | 0.0072 |
|  |  | 0.1 | 0.0062 | 0.0064 | 0.0062 | 0.0063 | 0.0097 | 0.0095 |
|  |  | 0.5 | 0.0077 | 0.0078 | 0.0077 | 0.0078 | 0.0140 | 0.0155 |
|  |  | 1.0 | 0.0089 | 0.0092 | 0.0092 | 0.0090 | 0.0185 | 0.0195 |

In the Table 3, polyol A is a polyether polyol having a hydroxyl value of 442 mg KOH/g obtained by the addition polymerization of propylene oxide (hereinafter referred to as PO) to tolylenediamine used as an initiator; polyol B is a polyether polyol having a hydroxyl value of 400 mg KOH/g obtained by the addition polymerization of PO to an aromatic amine compound which is a residue of tolylene diisocyanate production; polyol C is a polyether polyol having a hydroxyl value of 400 mg KOH/g obtained by the addition polymerization of PO to sucrose-diethylene glycol used as an initiator; and polyol D is a polyether polyol having a hydroxyl value of 450 mg KOH/g obtained by the addition polymerization of PO to sucrose-diethylene glycol used as an initiator. The foam stabilizer is silicone surface active agent F-318 (mfd. by Shinetsu Chemical Co., Ltd.); the blowing agent is Flon R-11 (mfd. by Showa Denko K.K.); catalyst A is dimethylethanolamine; catalyst B is dibutyl tin dilaurate; and the cell-interconnecting agent is calcium stearate (mfd. by Nippon Oil & Fats Co., Ltd.). The organic polyisocyanate is crude diphenylmethane diisocyanate (amine equivalent: 136) (mfd. by Nippon Polyurethane Industry Co., Ltd.). These raw materials were used in various combinations to be made into foams. Some of the foams thus obtained are shown in the Table 3 as Example Nos. 11 to 14 and Comparative Example Nos. F and G. The density, the open cell content, and the cell skeleton diameter of the rigid polyurethane foam 4 obatined are also shown in the Table 3.

The rigid polyurethane foam 11 obtained was subsequently heated at 120° C. for about 2 hours to evaporate the adsorbed moisture, and enveloped in a vessel 12 formed of metal-plastics laminate film having a laminate structure of aluminum-deposited polyester film and polyethylene film. The whole system was evacuated to reduce the internal pressure down to 0.001, 0.01, 0.1, 0.5, and 1.0 mm Hg and then hermetically sealed to give a heat insulating body 13, respectively. The evacuation time was 35 minutes, 5 minutes, 2 minutes, 1 minute and 30 seconds for Example Nos. 11 to 14, respectively, and 28 minutes, 5 minutes, 1 minute, and 30 seconds for Comparative Example Nos. F and G, respectively. The thermal conductivity of the obtained heat insulating body 13 immediately after the sealing is also shown in the Table 3. The thermal conductivity was determined at a mean temperature of 24° C. by using K-Matic (mfd. by Shinku Riko K.K.).

As is apparent from the Table 3, it has been found that the rigid polyurethane foam 11 of open cell structure obtained by using a polyol containing 70% by weight or more of polyether polyol having a hydroxyl value of 300 to 550 mg KOH/g obtained by the addition polymerization of an alkylene oxide to an aromatic diamine, an organic isocyanate, a catalyst, a blowing agent, a foam stabilizer and a cell-interconnecting agent has a very minute cell skeleton. This comes presumably, at least in part, from the compatibility of raw materials and the viscosity increase characteristic during the curing process of resin, although the mechanism has not yet been fully elucidated. The use of said rigid polyurethane foam 11 having a minute cell skeleton as the core material of a heat insulating body 13 makes it possible to reduce the gas thermal conductance in the heat insulating body 13 to the same level at a higher pressure as compared with the use of a foam having a larger cell skeleton, and thus gives an excellent heat insulating property at a pressure of 0.1 to 0.01 mm Hg which can be easily handled in industrial operation. Consequently, it contributes greatly to the improvement of productivity in that the evacuation time can be shortened resulting in easier mass production, and the necessary pressure can be attained by a simple evacuation apparatus.

Although it may be supposed that a cell skeleton of minute size would increase the resistance to evacuation and hence lengthen the evacuation time required to reach a predetermined pressure, actually it gives no influence in the pressure region of 0.01 mm Hg and begins to exhibit its effect only at 0.001 mm Hg region, where molecular flow becomes predominant. Accordingly, even when the cell skeleton is minute, no problem arises against productivity so long as a pressure of 0.1 to 0.01 mm Hg, which gives a satisfactory heat insulating property, is used.

EFFECT OF THE INVENTION

As is apparent from the above explanation, this invention provides the following effect.

The rigid polyurethane foam of open cell structure obtained by using a polyol containing 70% by weight or more of a polyether polyol having a hydroxyl value of 300 to 550 mm KOH/g prepared by the addition polymerization of an alkylene oxide to an aromatic diamine, an organic polyisocyanate, a catalyst, a foam stabilizer, a blowing agent, and a cell-interconnecting agent has a very minute cell skeleton. Accordingly, when the foam is enveloped in a vessel formed of metal-plastics laminate film and the whole system is evacuated to reduce the internal pressure, even at a pressure of 0.01 to 0.1 mm Hg which can be easily handled in industrial operation, the thermal conductance of gas is reduced sufficiently to give an excellent heat insulating property. This enables mass prodution to be conducted with a simple evacuation apparatus and a short evacuation time, and thus contributes to a marked improvement of productivity.

EXAMPLE IV

The fourth Example of this invention will be explained below.

This Example relates to rigid polyurethane foams prepared by foaming the raw materials shown in the Table 4 below by using a high pressure urethane foaming machine, followed by curing. They were then aged at normal temperature and cut to a predetermined dimension.

TABLE 4

| | | Example | | | | Comparative Example | | |
|---|---|---|---|---|---|---|---|---|
| | | 15 | 16 | 17 | 18 | H | I | J |
| Raw | Polyether A | 60 | 40 | 0 | 60 | 60 | 60 | 60 |
| materials | Polyether B | 40 | 60 | 100 | 40 | 40 | 40 | 40 |
| and | Foam stabilizer A | 3.0 | 3.5 | 4.5 | 4.5 | 2.5 | 1.5 | — |
| composition | Foam stabilizer B | — | — | — | — | — | — | 3.0 |
| (parts) | Blowing agent | 25 | 25 | 25 | 25 | 25 | 25 | 25 |
| | Catalyst A | 2.0 | 2.0 | 2.0 | 2.0 | 2.0 | 2.0 | 2.0 |
| | Catalyst B | 0.1 | 0.1 | 0.1 | 0.1 | 0.1 | 0.1 | 0.1 |
| | Cell-interconnecting agent | 1.0 | 1.0 | 1.0 | 1.0 | 1.0 | 1.0 | 1.0 |
| | Organic polyisocyanate | 122 | 125 | 130 | 122 | 122 | 122 | 122 |

TABLE 4-continued

| | | | Example | | | | Comparative Example | | |
|---|---|---|---|---|---|---|---|---|---|
| | | | 15 | 16 | 17 | 18 | H | I | J |
| Properties of rigid polyurethane foam | Density (kg/m³) | | 45 ± 2 | 45 ± 2 | 45 ± 2 | 45 ± 2 | 45 ± 2 | 45 ± 2 | 45 ± 2 |
| | Open cell content (%) | | 100 | 100 | 100 | 100 | 100 | 100 | 100 |
| | Cell skeleton diameter (μ) | | 100 ± 50 | 100 ± 50 | 100 ± 50 | 100 ± 50 | 300 ± 50 | 350 ± 50 | 100 ± 50 |
| Thermal conductivity of heat insulating body immediately after sealing (Kcal/mh °C.) | Internal pressure of heat insulating body (mmHg) | 0.001 | 0.0060 | 0.0060 | 0.0061 | 0.0059 | 0.0062 | 0.0061 | 0.0060 |
| | | 0.01 | 0.0061 | 0.0062 | 0.0061 | 0.0062 | 0.0073 | 0.0075 | 0.0063 |
| | | 0.1 | 0.0063 | 0.0063 | 0.0063 | 0.0065 | 0.0099 | 0.0101 | 0.0064 |
| | | 0.5 | 0.0079 | 0.0077 | 0.0078 | 0.0077 | 0.0145 | 0.0143 | 0.0080 |
| | | 1.0 | 0.0093 | 0.0090 | 0.0091 | 0.0090 | 0.0185 | 0.0180 | 0.0090 |
| Thermal conductivity after 80 days | | 0.01 | 0.0061 | | | | | | 0.0095 |

In the Table 4, polyol A is a polyether polyol having a hydroxyl value of 400 mg KOH/g obtained by the addition polymerization of propylene oxide (hereinafter referred to as PO) to tolylenediamine used as an initiator. Polyol B is a polyether polyol having a hydroxyl value of 450 mg KOH/g prepared by the addition polymerization of PO to sucrose-diethylene glycol used as an initiator.

The foam stabilizer A is silicone-type surface active agent F-338 (mfd. by Sin-etsu Chemical Co., Ltd.) having a hydroxyl group at the terminus of molecular structure; the foam stabilizer B is silicone surface active agent F-318 (mfd. by Shin-etsu Chemical Co., Ltd.) having an alkyl group at the terminus of molecular structure instead of a hydroxyl group. The blowing agent is Flon R-11 (mfd. by Showa Denko K.K.); the catalyst A is dimethylethanolamine; the catalyst B is dibutyl tin dilaurate; and the cell-interconnecting agent is calcium stearate (mfd. by Nippon Oil & Fats Co., Ltd.). The organic isocyanate is Takenate SI-12P (amine equivalent: 150) (mfd. by Takeda Chemical Industries, Ltd.). These raw materials were used in various combinations to be made into foams. Some of the foams obtained are shown in the Table as Example Nos. 15 to 18 and as Comparative Example Nos. H, I and J. The density, the open cell content, and the cell skeleton diameter of the rigid polyurethane foam 4 obtained are also shown in the Table 4.

The rigid polyurethane foam 11 thus obtained was subsequently heated at 120° C. for about 2 hours to evaporate the adsorbed moisture, and enveloped in a vessel 12 formed of metal-plastics laminate film having a laminate structure of aluminum-deposited polyester film and polyethylene film. The whole system was evacuated to reduce the internal pressure down to 0.001, 0.01, 0.1, 0.5, and 1.0 mm Hg, respectively, and then hermetically sealed to give a heat insulating body 13. The evacuation time was 40 minutes, 5 minutes, 2 minutes, 1 minute, and 30 seconds for Example Nos. 15 to 18, respectively, and 35 minutes, 5 minutes, 1 minute, and 30 seconds for Comparative Examples Nos. H to J, respectively. The thermal conductivity of the obtained heat insulating body 6 immediately after the sealing is shown in the Table 4. Further, the change of thermal conductivity with time after 80 days of standing was determined for samples prepared at an internal pressure of 0.01 mmHg in Example No. 15 and Comparative Example No. J and the results obtained are also shown in the Table. The thermal conductivity was determined at a mean temperature of 24° C. by using K-Matic (mfd. by Shinku Riko K.K.).

As is apparent from the Table 4, it has been found that the rigid polyurethane foam of open cell structure obtained by foaming a mixture comprising an organic polyisocyanate, a polyol, a catalyst, a blowing agent, a cell-interconnecting agent and, as a foam stabilizer, 3 parts by weight of a silicone-type surface active agent having a hydroxyl group at the terminus of molecular structure relative to 100 parts by weight of the polyol has a very minute cell skeleton. This is presumably because the foam stabilizer used in 3 parts by weight or more reduces the surface tension sufficiently, thereby exhibiting a foam-stabilizing effect which more than counterbalances the inhibitory action against foam stabilization caused by the foam-breaking effect of the cell-interconnecting agent, although the mechanism has not yet been fully elucidated.

The use of said rigid polyurethane foam 11 having a minute cell skeleton as the core material of a heat insulating body 13 makes it possible to reduce the gas thermal conductance in the heat insulating body 13 to the same level at a higher pressure as compared with the use of a foam having a larger cell skeleton, and thus gives an excellent heat insulating property at a pressure of 0.1 to 0.01 mmHg, which is easy to handle in industrial operation. Consequently, it contributes greatly to the improvement of productivity in that the evacuation time can be shortened resulting in easier mass production, and the production can be conducted by using a simple evacuating apparatus.

Although it may be supposed that a cell skeleton of minute size would increase the resistance to evacuation and hence lengthen the evacuation time required to reach a predetermined pressure, actually it has no influence in the pressure region of 0.01 mmHg and begins to exhibit its effect only at 0.001 mmHg region, where molecular flow becomes predominant. Accordingly, even when the cell skeleton is minute, no problem arises against productivity so long as a pressure of 0.1 to 0.01 mmHg, which gives a satisfactory heat insulating property, is used.

Further, it has been found that although a polyurethane foam of a similarly minute cell skeleton can be obtained by using a silicone-type surface active agent having a terminal alkyl group, the foam shows a large change with time in thermal conductivity when used as the core material of a heat insulating body 13, causing a problem in quality. The reason for this is that since a silicone-type surface active agent whose molecular terminus is an alkyl group which is unreactive, it is dispersed in its original low molecular foam into the rigid polyurethane foam 11 without being resinified, and evaporates with the lapse of time to increase the internal pressure, thereby deteriorating the thermal conductivity. When a silicone-type surface active agent whose molecular terminus is a hydroxyl group is used, such a problem does not arise since it reacts with organic polyisocyanate to form resin.

EFFECT OF THE INVENTION

As is apparent from the above explanation, this invention provides the following effect.

(a) The rigid polyurethane foam of open cell structure obtained by foaming a mixture comprising an organic polyisocyanate, a polyol, a catalyst, a blowing agent, a cell-interconnecting agent and, as a foam stabilizer, 3 parts by weight or more of a silicone-type surface active agent having a hydroxyl group at the terminus of molecular structure relative to 100 parts by weight of the polyol has a very minute cell skeleton. Accordingly, when the foam is enveloped in a vessel formed of metal-plastics laminate film and the whole system is evacuated to reduce the internal pressure, even at a pressure of 0.01 to 0.1 mmHg which is easy to handle in industrial operation, the thermal conductance of gas is reduced sufficiently to give an excellent heat insulating property. This enables mass production to be conducted with a simple evacuation apparatus and a short evacuation time, and thus contributes to a marked improvement of productivity.

(b) Since a silicone-type surface active agent having a hydroxyl group at the terminus of molecular structure is used as the foam stabilizer, it reacts with organic polyisocyanate to form resin. Consequently, the vaporization of the foam stabilizer and resulting increase in internal pressure and deterioration of thermal conductivity do not occur even when the heat insulating body is left standing for a long period of time. Thus, a heat insulating body of stable quality can be obtained.

EXAMPLE V

The fifth Example of this invention will be explained below.

This Example relates to rigid polyurethane foams prepared by using the raw materials in compositions shown in the Table 5 below in a high-pressure urethane foaming machine. The foams were aged at normal temperature and then cut to a predetermined dimension.

ing agent is Flon R-11 (mfd. by Showa Denko K.K.); catalyst A is DABCO-TMR (mfd. by Sankyo Air Products Co.); catalyst B is dimethylethanolamine; the cell-interconnecting agent is calcium stearte (mfd. by Nippon Oil & Fats Co., Ltd.). Organic polyisocyanate A is a polyisocyanate of an amine equivalent of 150 obtained by the reaction of tolylene diisocyanate with trimethylolpropane and diethylene glyco; organic polyisocyanate B is a crude diphenylmethane diisocyanate of an amine equivalent of 136 (mfd. by Nippon Plyurethane Industry Co., Ltd.). These raw materials were used in various combinations to be made into foams, which are shown in the Table 5 as Example Nos. 19 to 24 and as Comparative Example Nos. K and L. The density and the open cell content of these rigid polyurethane foams 11 are also shown in Table 5.

The foam was subsequently heat treated at 120° C. for about 2 hours to vaporize adsorbed moisture and unreacted monomer, and enveloped in a bag-formed vessel 12 formed of metal-plastics laminate film having a laminate structure of aluminum-deposited polyester film and polyethylene film. The whole system was evacuated to reduce the internal pressure down to 0.01 mmHg and 0.1 mmHg, respectively, and then hermetically sealed to give a heat insulating body 13. The evacuation time was 5 minutes and 2 minutes, respectively. The thermal conductivity of the heat insulating body 13 thus obtained are shown in the lower column of the Table 5. The thermal conductivity was determined at a mean temperature of 24° C. by using K-matic (mfd. by Shinku Riko K.K.).

As is apparent from the Table 5, the heat insulating body 13 according to this invention has been found to exhibit an excellent heat insulating property even when the internal pressure is 0.1 to 0.01 mmHg, which is easy to handle in industrial operation. This is conceivably because even when heat transfer due to gas thermal conductance increases, heat transfer due to solid thermal conductance decreases more than compensating the former.

Thus, it can be presumed that the addition of isocyanate-trimerization catalyst at an NCO/OH equivalent

TABLE 5

| | | | Example | | | | | | Comparative Example | |
|---|---|---|---|---|---|---|---|---|---|---|
| | | | 19 | 20 | 21 | 22 | 23 | 24 | K | L |
| Raw material composition (parts) | Polyol A | | 100 | 100 | 100 | 100 | 100 | 100 | 100 | 100 |
| | Foam stabilizer | | 1.5 | 1.5 | 1.5 | 1.5 | 1.5 | 1.5 | 1.5 | 1.5 |
| | Blowing agent | | 25 | 32 | 40 | 45 | 25 | 42 | 22 | 52 |
| | Catalyst A | | 2.0 | 2.0 | 2.0 | 2.0 | 2.0 | 2.0 | 0 | 0 |
| | Catalyst B | | 1.0 | 1.0 | 1.0 | 1.0 | 1.0 | 1.0 | 3.0 | 3.0 |
| | Cell interconnecting agent | | 0.5 | 0.5 | 0.5 | 0.5 | 0.5 | 0.5 | 0.5 | 0.5 |
| | Organic polyisocyanate A | | 155 | 215 | 300 | 350 | | | 131 | 420 |
| | Organic polyisocyanate B | | | | | | 140 | 310 | | |
| NCO/OH Equivalent ratio | | | 1.3 | 1.8 | 2.5 | 3.0 | 1.3 | 3.0 | 1.1 | 3.5 |
| Property of rigid polyurethane foam | Density (kg/m$^3$) | | 40 ± 2 | 40 ± 2 | 40 ± 2 | 40 ± 2 | 40 ± 2 | 40 ± 2 | 40 ± 2 | Defoaming (No foam is formed) |
| | Open cell content (%) | | 100 | 100 | 100 | 100 | 100 | 100 | 100 | |
| Thermal conductivity of heat insulating body (Kcal/mh °C.) | Internal pressure of heat insulating body (mmHg) | 0.01 | 0.0051 | 0.0050 | 0.0053 | 0.0056 | 0.0054 | 0.0057 | 0.0066 | |
| | | 0.1 | 0.0054 | 0.0054 | 0.0058 | 0.0060 | 0.0057 | 0.0060 | 0.0068 | |

In the Table 5, the polyol is a polyether polyol having a hydroxyl value of 440 mg KOH/g obtained by the addition polymerization of propylene oxide to an aromatic diamine used as an initiator. The foam stabilizer is Tegostab B 8404 (mfd. by Goldschmidt Ct.); the blowing ratio of 1.3 or more causes the trimerization of isocyanate to give a molecular structure less susceptibe to thermal vibration energy, resulting in a lower thermal conductivity of resin; further since the trimerization takes place abruptly near the gelation point of the resin, the cell skeleton is more highly oriented, which results in a longer heat-transfer distance along the cell skeleton at a given average cell diameter, causing the increase in resistance to heat transfer and the decrease in solid thermal conductivity. Further, the foam of Example No. 19 is excellent in thermal resistance as compared with the foam of Comparative Example No. K, and hence can be treated at higher temperature. Accordingly, it has an advantage in that heating time can be markedly reduced leading to the improvement of productivity.

When NCO/OH equivalent ratio exceeds 3.0, the reaction velocity becomes very unstable and cellbreaking goes on, leading ultimately to defoaming. Thus, the polyurethane foam obtained was unsuitable as the core material of a heat insulating body 13.

As is clear from the above explanation, this invention provides the following effect. Thus, the vacuum heat insulating body according to this invention has an extremely excellent heat insulating property even at a degree of vacuum of 0.1 to 0.01 mmHg. Consequently, it has an advantage in that mass production is possible with a simple evacuation apparatus and a short evacuation time, which contributes greatly to the marked imporvement of productivity.

EXAMPLE VI

Figure 3:
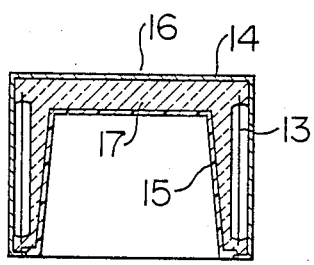
FIG. 3 is a cross-sectional view of an adiabatic box using said heat insulating body.

The sixth Example of this invention will be explained with reference to FIGS. 1 to 3 and the following Table 6.

In the Figures, numeral 11 indicates a rigid polyurethane foam cut to a predetermined dimension which has been prepared by foaming the raw materials used in a composition (parts) shown in the following Table 6 in a high-pressure urethane foaming machine followed by curing and then aging at normal temperature.

rate (mfd. by Nippon Oil & Fats Co., Ltd.). The organic polyisocyanate is a prepolymerized tolylene diisocyanate of an amine equivalent of 150 obtained by the reaction of tolylene diisocyanate with trimethylolpropane and diethylene glycol.

These raw materials were used in various combinations to be made into foams. Some of the foams obtained are shown in the Table 6 as Example Nos. 25 and 26 and as Comparative Example Nos. M and N. The density, the compressive strength (at 23° C. and at 120° C.) and the open cell content of the rigid polyurethane foam 11 thus obtained are also shown in the Table 6.

The foam was subsequently heated at 120° C. for about 2 hours to evaporate the adsorbed moisture, and enveloped in a vessel 12 formed of metal-plastics laminate film having a laminate structure of aluminum-deposited polyester film and polyethylene film. The whole system was evacuated to reduce the internal pressure down to 0.05 mmHg and hermetically sealed to give an heat insulating body 13. The evacuation time was 3 minutes. The thermal conductivity of the obtained heat insulating body 13 immediately after sealing are also shown in the Table. The thermal conductivity was determined at a mean temperature of 24° C. by using K-Matic (mfd. by Shinku Riko K.K.).

The heat insulating body 13 obtained above was disposed, adhered to the outer box 16 with an adhesive, between the inner box 15 and the outer box 16 of an adiabatic box 14, and the whole was subjected to integral foaming with a rigid polyurethane foam 17 of closed cell structure. Afterwards, the adiabatic box 14 was dismantled to observe the appearance of the heat insulating body 13. The results of observation are also shown in the Table 6.

As is apparent from the Table 6, it has been found that the rigid polyurethane obtained by foaming a mixture comprising a polyol containing 70% by weight or more

TABLE 6

| | | Example (No.) | | Comparative Example (No.) | |
|---|---|---|---|---|---|
| | | 25 | 26 | M | N |
| Raw material and composition (parts) | Polyol A | 100 | 70 | 60 | 60 |
| | Polyol B | 0 | 30 | 40 | 40 |
| | Foam stability | 3.0 | 3.0 | 3.0 | 3.0 |
| | Blowing agent | 25 | 25 | 25 | 17 |
| | Catalyst A | 2.0 | 2.0 | 2.0 | 2.0 |
| | Catalyst B | 0.1 | 0.1 | 0.1 | 0.1 |
| | Cell interconnecting agent | 1.0 | 1.0 | 1.0 | 1.0 |
| | Organic polyisocyanate | 130 | 126 | 125 | 125 |
| Property of rigid polyurethane foam | Density (kg/m$^3$) | 45 ± 2 | 45 ± 2 | 45 ± 2 | 60 ± 2 |
| | Open cell content (%) | 100 | 100 | 100 | 100 |
| | Compressive strength at 23° C. (kg/cm$^2$) | 4.1 | 4.0 | 3.2 | 5.0 |
| | at 120° C. | 1.6 | 1.5 | 1.0 | 1.7 |
| Thermal conductivity of heat insulating body (kcal/mh °C.) | | 0.0062 | 0.0063 | 0.0062 | 0.0088 |
| Appearance of heat insulating body after integral foaming | | Good | Good | Deformation, contraction | Good |

In the Table 6, polyol A is a polyether polyol having a hydroxyl value of 442 mg KOH/g obtained by the addition polymerization of propylene oxide (hereinafter referred to as PO) to an aromatic diamine used as an initiator; polyol B is a polyether polyol having an hydroxyl value of 400 mg KOH/g obtained by the addition polymerization of PO to sucrose, ethylenediamine and diethylene glycol used as an initiator. The foam stabilizer is silicone surface active agent F-338 (mfd. by Shin-etsu Chemical Co., Ltd.); the blowing agent is Flon R-11 (mfd. by Showa Denoko, K.K.); the catalyst A is dimethylethanolamine; the catalyst B is dibutyl tin dilaurate; the cell-interconnecting agent is calcium steaof polyether polyol having a hydroxyl value of 300 to 550 mg KOH/g obtained by the addition polymerization of an alkylene oxide to an aromatic diamine, an organic polyisocyanate, a catalyst, a foam stabilizer, a blowing agent, and a cell-interconnecting agent gives a good high-temperature strength at a low density. This is presumably because the rigid polyurethane foam has a large number of benzene rings dispersed in its molecule and hence acquires a structure less susceptible to thermal vibration, although the mechanism has not yet been fully elucidated. Further, it has an advantage in point of thermal conductivity since it can be used at a low density by virtue of its good strength. In other words, an excellent heat insulating property is obtained with a foam of low density because then the contribution of solid thermal conductance through the resin is small. Further, it has been revealed that when the polyurethane foam has a compressive strength at 120° C. of 1.5 kg/cm$^2$ or more, the heat insulating body 13 after integral foaming shows no deformation nor contraction and has no problem in respect to quality. Although the temperature of the part of the heat insulating body 13 facing the rigid polyurethane foam 17 of closed cell structure reaches 100° to 120° C. owing to the heat of reaction, the heat insulating body 13 can be satisfactorily used, so long as the polyurethane foam keeps a compressive strength of 1.5 kg/cm$^2$ or more at 120° C., without undergoing deformation or contraction due to atmospheric pressure difference and foaming pressure and without deterioration of heat insulating property and of appearance.

As is clear from the above explanation, this invention provides the following effect.

(a) The adiabatic box of this invention is obtained by disposing a heat insulating body, which has been prepared by enveloping a rigid polyurethane foam of open cell structure having a compressive strength of 1.5 kg/cm$^2$ or more at 120° C. in a vessel formed of metal-plastics laminate film and then evacuating the whole system to reduce the internal pressure, between the inner box and the outer box of an adiabatic box, and then subjecting the whole to integral foaming with rigid polyurethane foam. Therefore, the heat insulating body undergoes no deformation nor contraction due to atmospheric pressure and foaming pressure even when the rigid polyurethane foam therein is heated to about 120° C. owing to the heat of reaction during integral foaming, in which the temperature can reach 100° to 120° C., because the rigid polyurethane foam keeps a compressive strength of 1.5 kg/cm$^2$ or more even at the temperature. Accordingly, there occurs no formation of void in the rigid polyurethane foam owing to deformation and contraction nor resulting deterioration of heat insulating property. This contributes much to stabilizing the quality of an adiabatic box.

(b) The above-mentioned rigid polyurethane foam is formed by using a polyol containing 70% by weight or more of polyether polyol having a hydroxyl value of 300 to 550 mg KOH/g obtained by the addition polymerization of an alkylene oxide to an aromatic diamine, an organic polyisocyanate, a catalyst, a foam stabilizer, a blowing agent, and a cell-interconnecting agent. Consequently, it exhibits a satisfactory strength even at low density and, particularly, can maintain a sufficient strength to withstand the atmospheric pressure and foaming pressure even at a high temperature. Accordingly, it does not have the problem of necessarily increasing the density for securing strength and thereby deteriorating the thermal conductivity owing to the increase of contribution of the solid conductance through the resin, and thus can provide a heat insulating body having both good strength and excellent heat insulating property.

The heat insulating property of an adiabatic box can be improved by using therein the above-mentioned heat insulating body having such excellent heat insulation characteristics.

What is claimed is:

1. A heat insulating body comprising a rigid polyurethane foam of open cell structure formed by foaming a mixture comprising an organic polyisocyanate, a polyol, a catalyst, a foam stabilizer, a blowing agent, and as a cell-interconnecting agent, 0.1 to 5.0 parts by weight of a powdery divalent metal salt of a saturated monocarboxylic acid, the organic polyisocyanate used in forming the rigid polyurethane foam being a purified diphenylmethane diisocyante, a modified product of purified diphenylmethane diisocyanate, and a prepolymerized purified tolylene diisocyanate obtained by the preliminary reaction of purified tolylene diisocyanate and polyol, used each alone or as a mixture thereof, and has an amine equivalent of 120 to 180, and the polyol used in forming the rigid polyurethane foam being a polyol containing 70% by weight or more of a polyether polyol having a hydroxyl value of 300 to 550 mg KOH/g obtained by the addition polymerization of an alkylene oxide to an aromatic diamine, and a vessel formed of metal-plastics laminate film enveloping said rigid polyurethane foam, the whole system being evauacated to reduce the internal pressure and then hermetically sealed.

2. A heat insulating body according to claim 1, wherein the foam stabilizer used in forming the polyurethane foam is a silicone-type surface active agent having a hydroxyl group at the terminus of the molecular structure and is used in an amount of 3 parts by weight or more based on 100 parts by weight of the polyol.

3. A heat insulating body according to claim 1, wherein the rigid polyurethane foam of open cell structure used is formed by foaming with an isocyanatetrimerization catalyst and at a ratio of the organic polyisocyanate to the polyol of 1.3 to 3.0 in terms of NCO/OH equivalent ratio.

4. An adiabatic box comprsing a heat insulating body obtained by enveloping a rigid polyurethane foam of open cell structure having a compressive strength at 120° C. of 1.5 kg/cm$^2$ or more in a vessel formed of metal-plastics laminate film and then evacuating the whole to reduce the internal pressure, an inner box, and an outer box, said heat insulating body being disposed between said inner box and said outer box and the whole system being subjected to integral foaming with rigid polyurethane foam.

5. An adiabatic box according to claim 4, wherein the rigid polyurethane foam of open cell structure having a compressive strength at 120° C. of 1.5 kg/cm$^2$ or more used in said heat insulating body is formed by using a polyol containing 70% by weight or more of a polyol having a hydroxy value of 300 to 550 mg KOH/g obtained by the addition polymerization of an alkylene oxide to an aromatic diamine, an organic polyisocyanate, a catalyst, a foam stabilizer, a blowing agent, and a cell-interconnecting agent.

* * * * *